United States Patent [19]

Sherman

[11] 3,789,374

[45] Jan. 29, 1974

[54] DOMAIN WALL PROPAGATING DEVICE

[75] Inventor: Philip Sherman, San Diego, Calif.

[73] Assignee: Instrument Development Laboratories, Inc., Wantagh, N.Y.

[22] Filed: Sept. 14, 1972

[21] Appl. No.: 288,895

[52] U.S. Cl.. 340/174 PW, 340/174 S, 340/174 TF, 340/174 TW, 340/174 VA, 340/174 VC, 340/174 SR

[51] Int. Cl. ........................ G11c 19/00, G11c 11/04

[58] Field of Search340/174 PW, 174 VA, 174 TW, 340/174 VC

[56] References Cited

UNITED STATES PATENTS

| | | | |
|---|---|---|---|
| 3,137,845 | 6/1964 | Snyder | 340/174 VA |
| 3,365,290 | 1/1968 | Smith et al. | 340/174 TW |
| 3,670,312 | 6/1972 | Broadbent | 340/174 TW |

*Primary Examiner*—James W. Moffitt

[57] ABSTRACT

A domain wall propagating device with a magnetic wire wound in grooves on a substrate. Coils wound around the wire are placed in recesses in the substrate. A propagating winding is wrapped around the substrate, and the device may be covered with a magnetic shielding layer. To avoid damaging the magnetic wire during the fabrication of the device, the coils are wound on a tubular mandrel through which the magnetic wire extends. The magnetic wire may be supported in a channel formed between a pair of non-magnetic wires bonded together.

9 Claims, 14 Drawing Figures

DOMAIN WALL PROPAGATING DEVICE

This invention relates to domain wall propagating devices and to a method for producing such devices. The invention is particularly concerned with the provision of a domain wall propagating device, useful for example as a shift register, or other digital storage device of this type, that is easily fabricated.

Domain wall propagating devices of the type of concern herein generally employ a fine wire having certain desirable magnetic properties for the storage, input and output of binary coded information in the form of reversed magnetic domains. The magnetic wire, such as Permalloy, Remendur, and other similar materials of the nickel-iron and cobalt-iron group of alloys, sometimes exhibit properties characterized by a re-entrant hysteresis loop. This characteristic renders it possible to nucleate a small stable length of a reversed magnetic region by application of a magnetic field of the proper characteristics to the wire, when the wire is premagnetized in one direction.

In the fabrication of a suitable domain wall propagating device, extreme care must be exercised in the selection and processing of the magnetic element. For example, a high purity vacuum melt of desired composition may initially be cast into a slender rod of suitable diameter, e.g., ½ inch. The rod is then shaved, melt zone refined, machined to a desired high finish, given a homogenizing anneal, electrically polished, and drawn through a set of diamond dies from 0.125 to 0.100 inches in diameter. The drawn wire is then stress relieved at about 800–900 C at 6 to 10 feet/min. in a reducing atmosphere and is then drawn through a set of diamond dies to a diameter of from 0.00025 to 0.0008 inches, depending upon the desired application. The wire is then electrolytically or chemically polished, gold plated in case of alloys attacked by corrosion even as cobalt-iron alloys, and tested for uniformity of its magnetic properties. Drawing in the final stage, annealing, polishing, tensioning and testing may be accomplished in a continuous operation, in order to permit controlling the process to obtain the desired characteristics.

In view of the difficulty in producing the magnetic element and the care that must be exercised in its production, it is evident that the domain wall propagating devices, employing such fine wire must be designed to ensure protection of the wire during the fabrication of the device in order to avoid any damage to the fragile element.

While functionally satisfactory domain wall propagating devices have been fabricated in the past, they were difficult to manufacture, especially in small compact form, and their structure required extreme care to avoid damage to the magnetic element when elements of small dimension were employed.

The present invention is directed to the provision of an improved domain wall propagating device that is easily fabricated even in miniature form, with a minimum of risk of damaging the magnetic element. The invention is also directed to an improved method for providing coils coupled to the magnetic element.

Briefly stated in accordance with one aspect of the invention, a domain wall propagating device is comprised of a non-magnetic substrate, for example in the form of a tube. The outer surface of the tube may be provided with a helical groove of proper pitch, and a magnetic element, in the form of a fine wire or tape, is wound in the groove. Indentations are provided on the surface of the tube to receive coils wound around the magnetic element, so that the surface of the tube, with the windings in place, is smooth. In a preferred embodiment of the invention, the magnetic element is a composite element formed of a pair of non-magnetic wires bonded together, to form a channel in which a magnetic wire is wound, in order to provide protection for the magnetic wire especially during fabrication of the device. In this embodiment the coils are wound directly over the combined channel-magnetic wire structure.

After the magnetic element and coils are positioned on the substrate, a propagating winding as hereinafter described, is wound around the device, and a magnetic shield layer may then be wound around or otherwise applied to the propagating winding.

The propagating winding may be preformed, for example by forming windings from conducting tape on a plastic sheet, and bonding the conducting tape to the sheet. The entire propagating winding, held together with the plastic sheet, may then be wrapped around the substrate. The completed device may be inserted in a suitable protecting enclosure of conventional nature.

According to another aspect of the invention, the coils coupled to the magnetic element are wound around the magnetic element during the process of winding the magnetic element on the substrate. While such a technique in its usual form would be undesirable since winding the coils directly on the magnetic element might result in damage to the magnetic element, in accordance with the invention the magnetic element is fed to the substrate through a hollow rotatable tubular mandrel, and the coupling windings, such as nucleating, biasing and sensing coils, are wound on the mandrel as it rotates. The formed coupling windings may then be easily slipped off the mandrel and slipped along the magnetic element to their final positions in the indentations in the substrate. This method therefore avoids damage to the fragile magnetic element.

The invention will now be described in greater detail with reference to the accompanying drawings, in which.

Figure 1:
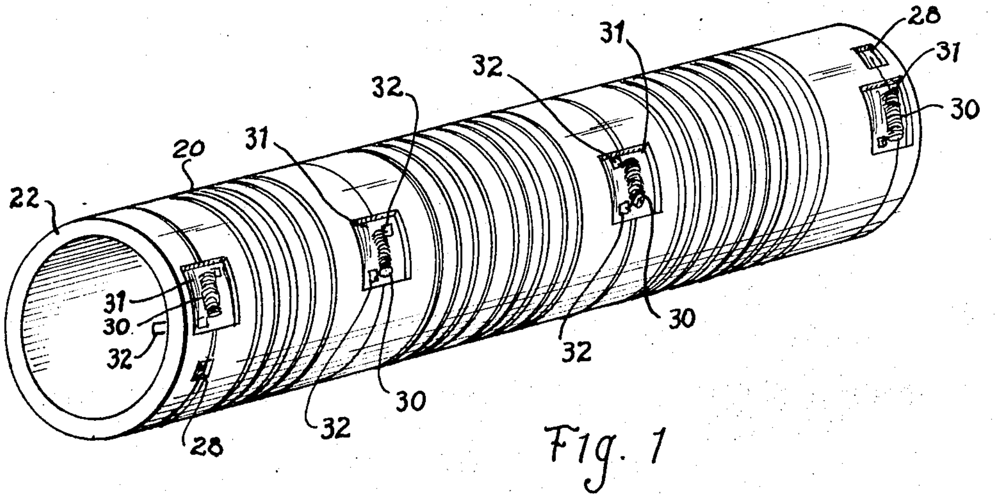
FIG. 1 is a perspective view of a portion of a domain wall propagating device according to the invention, illustrating the magnetic wire wound on a substrate, and the coils coupled thereto.
Figure 2:
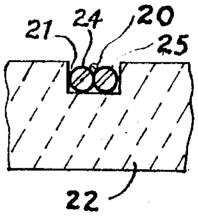
FIG. 2 is an enlarged cross sectional view of a preferred embodiment of a portion of the device of FIG. 1, taken in a plane parallel to the axis thereof, and showing support of the magnetic wire by a pair of non-magnetic wires.

Referring now to the drawings, and more in particular to FIG. 1, therein is illustrated the substrate and magnetic wire winding portion of a domain wall propagating device according to one embodiment of the invention. The winding 20 is wound in helical grooves 21 formed on the external surface of a tubular substrate 22 as shown in FIG. 2. As will be discussed in the following paragraphs, the wire 20 may be a single wire or tape of a material such as Permalloy or Remendur, having a reentrant hysteresis loop, or it may be a composite structure, for example, formed of such a wire supported between a pair of larger non-magnetic wires or strings. The substrate 22 should be of an insulating material having a thermal coefficient of expansion, similar to that of the wire. As an example, a material such as Pyroceram has been found to be suitable for this purpose.

In order to protect the magnetic wire, which may have a diameter of less than 0.0003mils, it is preferred that the wire be supported in the channel formed by a pair of non-magnetic wires bonded together, the non-magnetic wires having a diameter greater than the magnetic wire. This construction is illustrated in the cross-sectional view of FIG. 2, wherein it is seen that a pair of non-magnetic wires 24 and 25 are bonded together by any suitable conventional process and are wound in the groove 21, with the magnetic wire 20 being positioned in the groove formed at the junction of the two non-magnetic wires.

Figure 3:
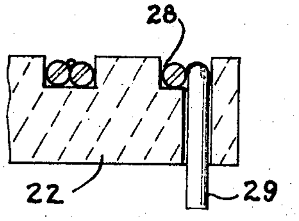
FIGS. 3, 4 and 5 are enlarged cross sectional views of portions of the device of FIG. 1, taken along planes parallel to the axis thereof, and illustrating respectively the connection of the end of the magnetic wire, a section through a centrally disposed coil, and a section through an end coil.

Referring again to FIG. 1, a recess 28 is formed in the outer surface of the substrate 22 at each end thereof, to provide means for terminating the wires. This arrangement is more clearly seen in the cross-sectional view of FIG. 3, wherein it is seen that the ends of the wire are attached to a pin 29 extending through the substrate to the bottom of the recess 28. The bonding may be any conventinal means, such as soldering or welding, and the pin may extend into the central space of the substrate to facilitate connection of leads thereto in the finished structure.

Figure 4:
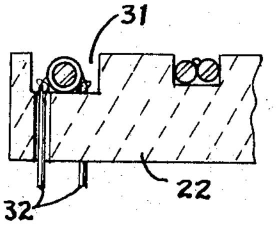
Figure 5:
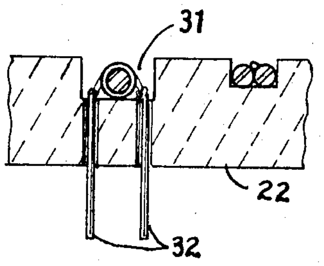
Figure 6:
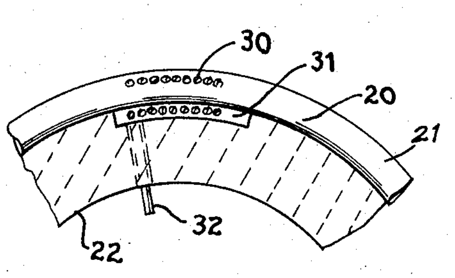
FIG. 6 is an enlarged cross sectional view of a portion of the device of FIG. 1, taken in a plane transverse of the axis of the device through one of the coils.

Referring again to FIG. 1, two or more coils 30 are wound around the wire 20 at spaced locations, the coils being located in suitable recesses 31 formed in the outer surface of the substrate. A pair of pins 32 extends through the substrate into the bottom of each recess 31, and the ends of the coils 30 are connected to the respective pins, for example by welding. The pins must be disposed in any desired manner within the recesses, and thus FIG. 1 shows several alternative dispositions of the pins on the two illustrated recesses. The pins extend into the interior hollow space of the substrate to facilitate the connection of suitable electric leads thereto. The structure and formation of the coils and their attachment to the pins is more clearly illustrated in the cross-sectional views of FIGS. 4, 5 and 6, wherein FIG. 4 is a cross-sectional view of an end coil and FIG. 5 is a cross-sectional view of a centrally disposed coil, taken in a plane extending through the axis of the substrate, and FIG. 6 is a cross-sectional view of the structure transverse of the axis of the substrate. As shown in FIG. 1, the pitch of the wire 20 in the regions of the recesses 30 is increased to accomodate the recesses. The coils 30 are employed to nucleate (write) the reversed domains into the magnetic wire, and to sense (read) the passage of the reversed domains through the magnetic wire. Thus, in the finished structure, electrical leads are connected to the pins 32 to permit their external connection to suitable writing and reading circuits. Such circuits are conventional and hence no description of them is necessary here.

In the structure above described with reference to FIGS. 1–6, it is apparent that a predetermined number of turns of magnetic wire and a predetermined number of coils coupled to the magnetic wire may be provided in such a manner that the wire and coils do not extend above the surface of the substrate, and yet the magnetic wire is held as close as possible to the surface of the substrate. The channel formed by the pair of non-magnetic wires protects the delicate magnetic wire from damage, for example during fabrication of the device, and the coils are wound directly around the combined structure of the channel and the magnetic wire. The magnetic wire is also held in the desired tension in the finished device. In addition, the surface of the structure of FIGS. 1–6 forms a smooth surface on the substrate for subsequent operations in completing the device.

Figure 7:
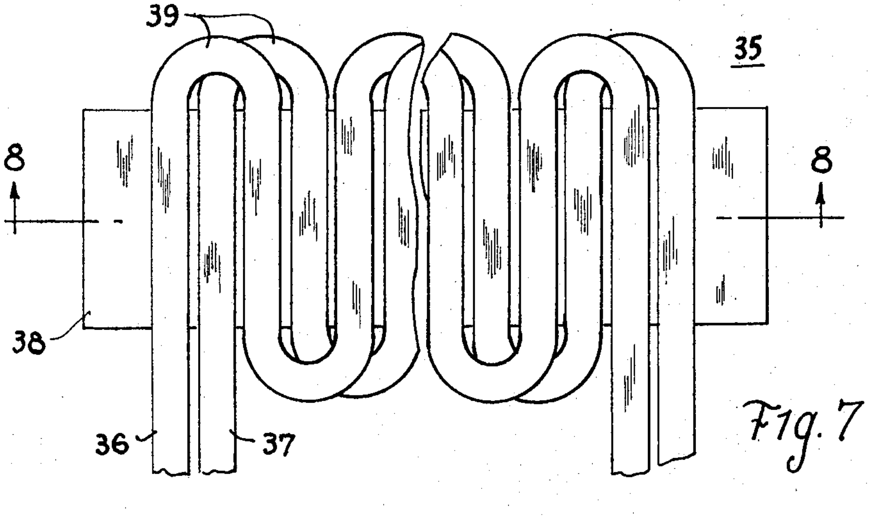
FIG. 7 is a top view of a propagating winding for use on a device according to the invention, prior to assembly on the device.
Figure 8:
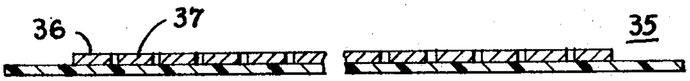
FIG. 8 is a cross sectional view of the winding of FIG. 7, taken along the lines 8—8.

A propagating winding 35 for the device of the invention is illustrated in FIGS. 7 and 8. The propagating winding 35 is formed of a pair of conductor strips 36 and 37 laid side-by-side, for example on an insulating plastic sheet 38, such as Mylar sheet, in non-contacting relationship, the pair of conductors undulating back-and-forth across the surface of the sheet 38 a predetermined number of times. The pitch of the undulations is determined by the length of the stable domains in the magnetic wire 20 of FIG. 1. As an example, each strip conductor might have a width of 25 mils with a separation of one mil between adjacent conductors, and 40 or more pairs of adjacent conductors in the winding. The length of the straight portions 39 of the conductors, as well as the width of the plastic sheet 38, should be somewhat longer than the length of the substrate 22 of FIG. 1.

Figure 9:
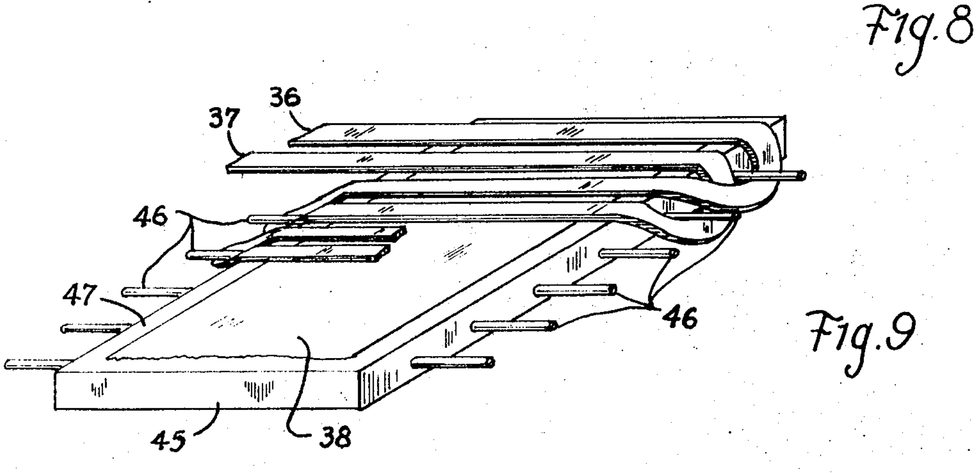
FIG. 9 is a perspective view illustrating one technique for forming the winding of FIG. 7.

FIG. 9 illustrates a manner in which the propagating winding may be formed, in order to more clearly illustrate the structure of the winding. A suitable jig for forming the winding is comprised of a rectangular plate 45 having a plurality of regularly spaced removable pins 46 extending from a pair of opposite edges thereof. The plastic sheet is laid on the top surface 47 of the plate. One of the conductors, i.e. the conductor 37, is then wrapped back-and-forth across the surface of the plastic, so that the loops of each end of each undulation are held by the pins 46. In forming this winding of course only every other pin on each side of the plate is employed. The other winding, employing conductor 36, is then formed in a similar manner around the remaining pins 46. The plastic sheet forms a support for the winding 35, so that it may later be wound around the substrate 22, and hence it is necessary to bond conductors 36 and 37 to the plastic sheet prior to removal from the jig. This bonding may be done in any conventional manner, for example by means of a suitable conventional adhesive. The pins 46 may then be removed from the plate 45, and the finished propagating winding 35 removed from the plate. If desired, the winding may be covered with a plastic sheet, so that it is sandwiched between a pair of plastic sheets.

Figure 10:
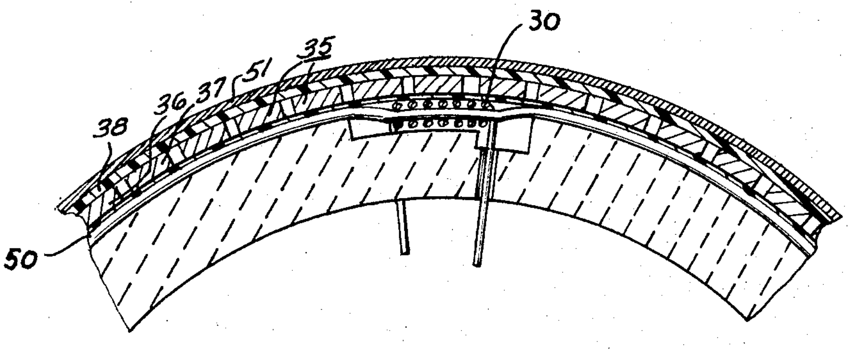
FIG. 10 is an enlarged cross sectional view of a portion of a completed domain wall propagating device according to the invention, taken in a plane transverse of the axis of the device.

The propagating winding 35 is assembled on the substrate 22 in the manner illustrated in the cross-sectional view of a portion with the conductors extending transversely of the groove 21 and wire 20 of the device illustrated in FIG. 10. A thin film 50 of a suitable resin may first be applied to the outside surface of the substrate, and after the resin has cured the propagating winding is wrapped around the substrate, with the plastic sheet 38 on the outside and the conductors 36 and 37 adjacent the resin layer 50. The propagating windings must be precisely registered with respect to the coils 30 on the substrate. The assembly is then wrapped with a suitable magnetic shielding layer 51, such as an annealed Permalloy sheet, about 2 mils thick, in order to protect the magnetic wire from stray magnetic fields. The layer 51 also enhances the fields of the propagating winding, so that lower currents are required in the propagating windings to create the desired propagating fields. Localized switching in the layer 51 may also aid in the propagation of the domains in the magnetic wire. As an alternative, the magnetic shielding layer 51 may be assembled on the propagating winding prior to wrapping the propagating winding on the substrate.

Figures 11, 12:
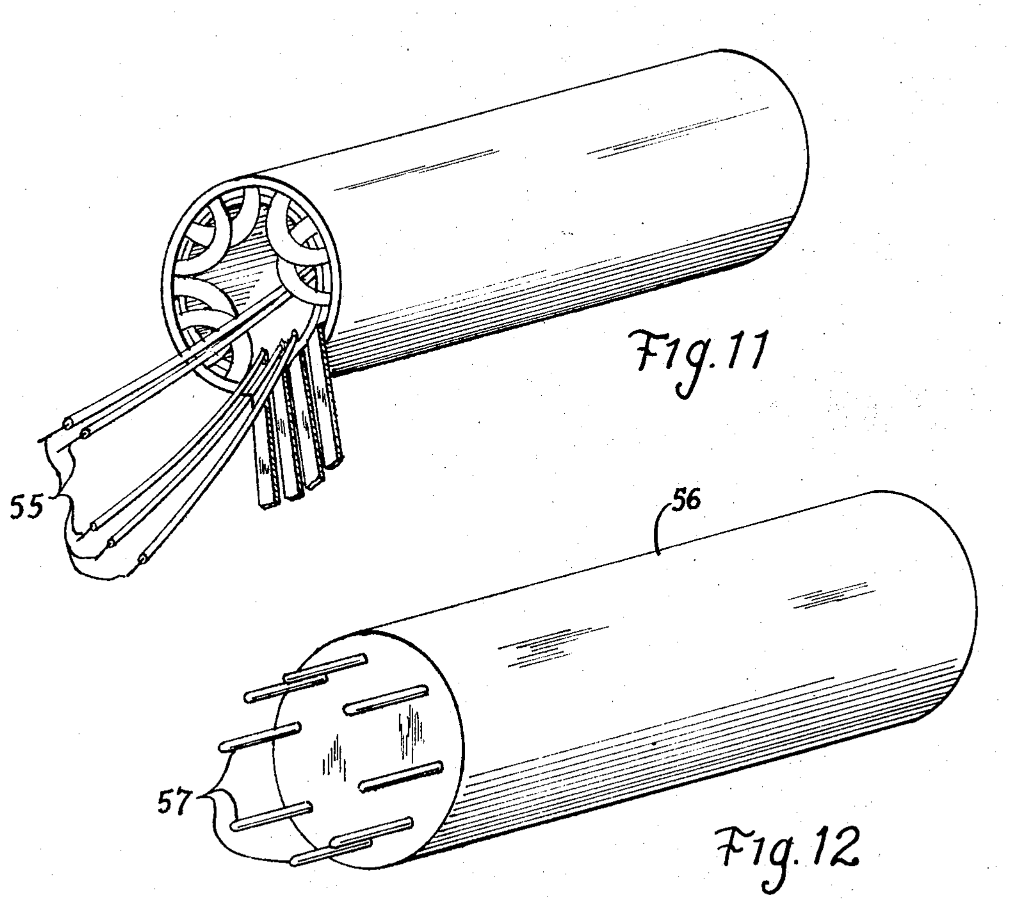
FIG. 11 is a perspective view of a completed domain wall propagating device according to the invention, prior to assembly in a container.
FIG. 12 is a perspective view of a suitable container for the device of FIG. 11.

In the next step in fabrication of a device according to the invention, as illustrated in FIG. 11, suitable conductors 55 are connected to the conducting pins, such as the pins 29 and 32, extending into the substrate, and the entire assembly may then be inserted in a suitable container or can 56 (FIG. 12) with the leads of the device internally connected to pins or leads 57 extending from the container 56. The container may be fabricated in any conventional manner, and it may be evacuated or filled with an inert atmosphere, if desired, and have provision for temperature control. The temperature controlling device must be housed, for example, in a support (not shown) for the device within the container.

Figure 13:
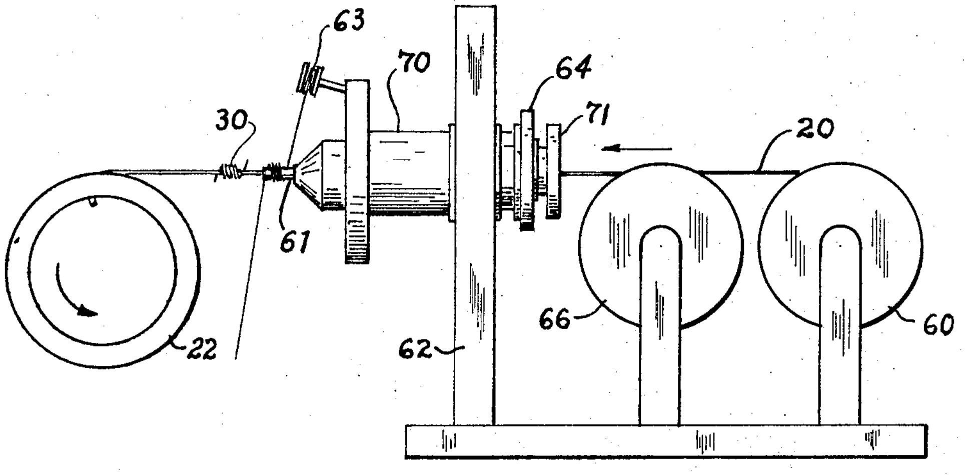
FIG. 13 is a simplified schematic illustration of a method for forming the device of FIG. 1 according to a further embodiment of the invention.

In the fabrication of the device according to the invention, when the coils 30 are formed around the magnetic wire, it is desirable that the coils should not be directly wound on the wire in order to prevent damage to the wire. This may be done, in accordance with a further aspect of the invention, by winding the coils in accordance with the arrangement illustrated in FIG. 13. Referring now to FIG. 13, the magnetic wire on a supply spool 60 is passed through a center hole in a rotatable mandrel 61, and then into the grooves on the substrate 22. In this arrangement, any suitable conventional means (not shown) may be employed for holding and rotating the substrate, and suitable tension is applied to the wire 20 by means of a torque motor on the spool 60. The rotatable mandrel 61 is held in a rotatable holder 70 which is rotatably mounted in a suitable fixed jig 62. A supply spool 63 for wire for the coils may also be suitably mounted on the holder. The mandrel 61 may be rotated manually, for example by means of a knob 64, or any suitable rotating means (not shown) may be provided for automatically rotating the mandrel.

Coil wire from the spool 63 is wrapped around the mandrel to form the coil, and once the coil is formed it may be slipped off the end of the mandrel, for example by pulling the release knob 71, onto the wire 20, and thence moved into place in a suitable recess in the substrate. FIG. 13 illustrates one coil being formed on the mandrel, and another coil 30 that has been slipped off the mandrel. If it is desired to form the structure as illustrated in FIG. 2, i.e., having a pair of non-magnetic wires 24 and 25 for supporting the magnetic wire, a spool 66 of the non-magnetic wire bonded together may be provided, in front of the jig, so that the magnetic wire and non-magnetic wire are simultaneously fed through the hole in the mandrel. If desired, means may also be provided for bonding the magnetic wire, for example by means of a suitable resin, in the channel between the two non-magnetic wires. The arrangement of FIG. 13 thus provides means for readily winding the coils 30 without risking damage to the magnetic wire. When a channel formed by a bonded pair of non-magnetic wires is employed to protect the magnetic elements, as above described, the coils may be directly tightly wrapped on the channel without using the mandrel, although in this case the mandrel may be used if desired.

Figure 14:
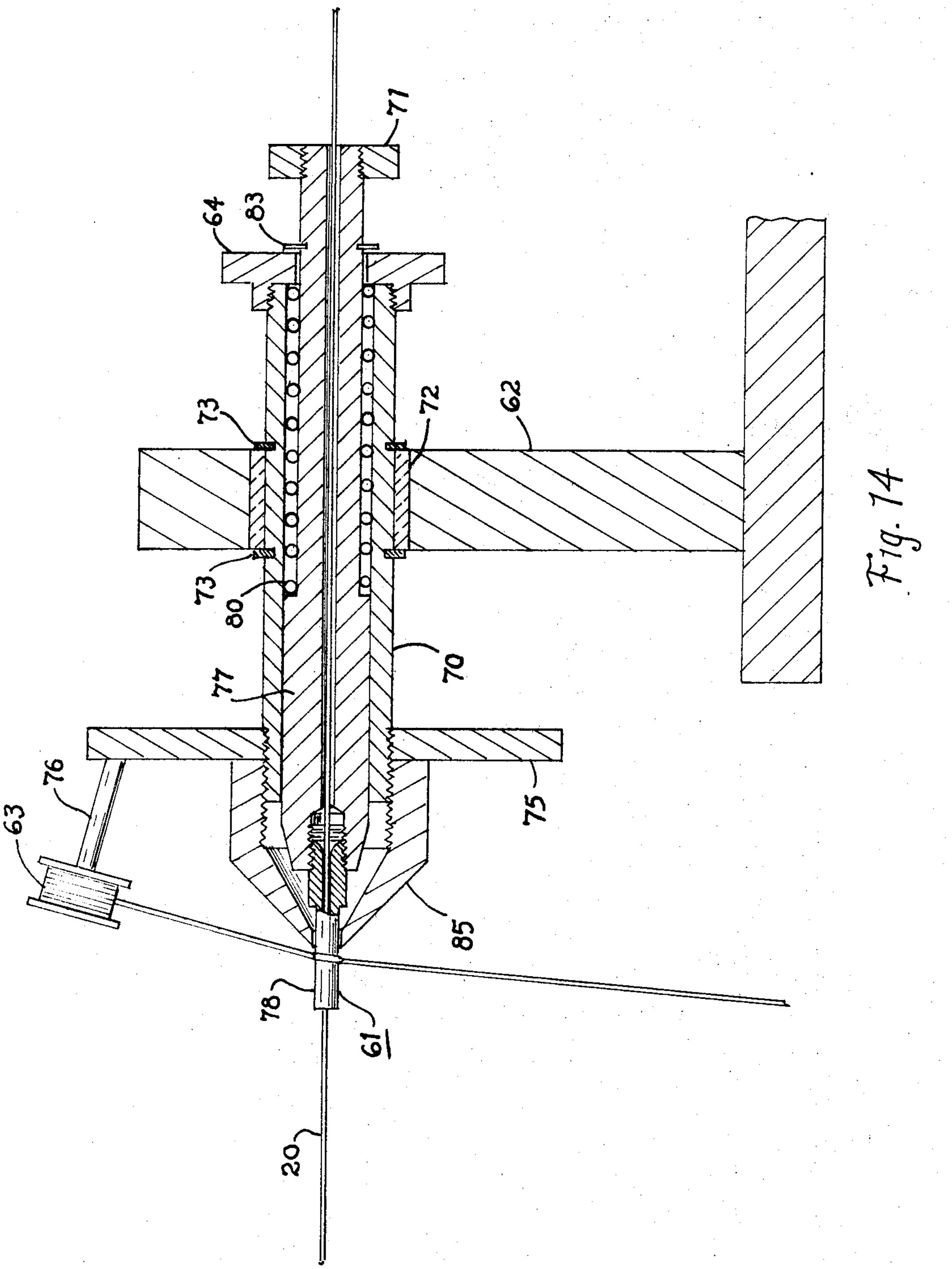
FIG. 14 is an enlarged partially cross sectional view of a portion of the winding apparatus shown in FIG. 13.

The structure of the portion of the arrangement of FIG. 13 for winding the coil 30 is more clearly seen in FIG. 14. Referring now to FIG. 14, the rotatable holder 70 is mounted, for example in bearing 72, for rotation in the upright member of the fixed jig 62. Axial movement of the holder with respect to the jig may be prevented by any conventional means, such as retaining rings 73 on the holder on each side of the bearing 72. The knob 64 is threaded on the holder 70 on one side of the jig, and a spool holder 75 is threaded on the holder 70 on the other side of the jig. The spool 63 of wire for the coil to be wound on the mandrel is mounted on the spool holder 75, for example on a shaft 76 affixed to the holder 75. The axis of the spool may be slanted so that the wire from the spool feeds properly onto the mandrel 61.

The holder 70 has a central aperture extending there through for receiving the mandrel 61. The mandrel may be formed of a tube 77 slidably extending through the holder 70, and extending beyond the knob 64 on one end, with the release knob 71 being threaded on the extending end thereof. A smaller tube 78 is threaded in the other end of the tube, and extends beyond the holder to permit the coil to be wound thereon, the wire 20 extending through the tubes 77 and 78. The tube 77 is provided with a shoulder 80, the diameter of the tube 77 being reduced on the end thereof toward the knob 71, and a spring 81 extends between the shoulder 80 and the inside of the knob 64 and surrounding the reduced diameter portion of the tube 77, to urge the tube 78 outwardly from the holder. The movement of the tubes 77 and 78 in this direction is limited by suitable means such as a retaining ring 83 in a groove in the tube 77 for engaging the knob 64. Thus, the tube 78 normally extends from the holder, but may be withdrawn by pulling the knob 71 against the force of the spring 81. A suitably shaped cap 85 may be provided on the end of the holder 70 and surrounding the tube 78 to prevent damage to the wire from the spool 63 while the coil is being wound and withdrawn. In operation, the holder 70 is rotated to wrap the wire from the spool 63 around the tube 78 to form the coil, and after the coil is formed the knob 71 is pulled so that the cap 85 urges the formed coil off the tube 78 and onto the wire 20.

While the invention has been described with reference to specific embodiments thereof, it will be appreciated that many variations and modifications may be made therein without departing from the spirit and scope of the invention. For example only, it is apparent that the substrate may assume other shapes and forms, that the magnetic wire may be a single wire or a composite structure as disclosed, that the propagating winding may also be formed in different manners and the terminations of the nucleating and sense coils can be fed through the holes in the substrate to the terminal, at the end of the substrate, or across the surface of the substrate to the terminals at the end of the substrate. It is therefore intended in the following claims to cover all such obvious modifications and variations as fall within the true spirit and scope of the invention.

What is claimed is:

1. A domain wall propagating device comprising a non-magnetic substrate having in its external surface a helical winding groove and a plurality of recesses joining said groove, a magnetic wire wound in said groove, a plurality of coils coupled to said wire and positioned in separate said recesses, and a propagating winding surrounding said external surface, the conductors of said propagating winding extending substantially transversely of said grooves.

2. The device of claim 1 further comprising a pair of non-conducting strands together forming a channel therebetween and being wound in said groove, said magnetic wire being laid in said channel.

3. The device of claim 1 wherein said magnetic wire and coils do not extend beyond the surface of said substrate.

4. The device of claim 1 wherein said substrate is in the form of a tubular cylinder, comprising connecting pins extending through said cylinder at said recesses for connection of leads within said cylinder, the ends of said coils being connected to said pins within said recesses.

5. The device of claim 1 wherein said propagating winding is comprised of at least a pair of strip conductors wound back and forth on a plastic sheet and bonded thereto, said winding being wrapped on said substrate with the conductors of said propagating winding toward said substrate, in registration with the strip conductors and the coils.

6. The device of claim 1 further comprising a magnetic shield surrounding said propagating winding.

7. A domain wall propagating device comprising a tubular cylindrical non-magnetic substrate having a helical groove in its outer surface, a plurality of recesses in said surface aligned with said groove, a plurality of coupling coils in separate said recesses with circumferentially extending axes, connecting pin means extending through the walls of said substrate at said recesses and into the center of said substrate to permit connection of electrical leads thereto, the ends of said coils being connected to said pins in said recesses, and magnetic wire means wound in siad groove and coupled to said coils.

8. The domain wall propagating device of claim 7 further comprising a pair of non-magnetic wires wound in said groove and being bonded together to form a channel therebetween, said magnetic wire being wound in said channel.

9. The domain wall propagating device of claim 7 further comprising a propagating winding wound around said substrate, and a magnetic shield surrounding said propagating winding, said propagating winding comprising a pair of strip conductors extending back and forth across said surface substantially transversely of said groove with said conductors being circumferentially spaced from each other and having alternate turns adjacent said surface, and a plastic sheet surrounding said conductors and being bonded thereto.

* * * * *